United States Patent
Zhao et al.

(10) Patent No.: US 8,036,270 B2
(45) Date of Patent: Oct. 11, 2011

(54) INTRA-FRAME FLICKER REDUCTION IN VIDEO CODING

(75) Inventors: Jie Zhao, Camas, WA (US); Christopher A. Segall, Camas, WA (US); Shawmin Lei, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1475 days.

(21) Appl. No.: 11/460,564

(22) Filed: Jul. 27, 2006

(65) Prior Publication Data
US 2008/0025397 A1 Jan. 31, 2008

(51) Int. Cl.
*H04N 11/04* (2006.01)
*H04N 7/12* (2006.01)
*H04N 7/01* (2006.01)

(52) U.S. Cl. ......... 375/240.15; 375/240.13; 375/240.26; 348/447

(58) Field of Classification Search .............. 375/240.15; 348/447
See application file for complete search history.

(56) References Cited

U.S. PATENT DOCUMENTS

| | | |
|---|---|---|
| 2003/0163209 A1 | 8/2003 | Fukuhara et al. |
| 2005/0163388 A1 | 7/2005 | Schwartz et al. |
| 2007/0036213 A1* | 2/2007 | Matsumura et al. ..... 375/240.03 |
| 2008/0101465 A1* | 5/2008 | Chono et al. ............. 375/240.03 |

FOREIGN PATENT DOCUMENTS

| | | |
|---|---|---|
| JP | 02254884 A2 | 10/1990 |
| JP | 05111007 A2 | 4/1993 |
| JP | 08223573 A2 | 8/1996 |
| JP | 2005039321 A2 | 2/2005 |

OTHER PUBLICATIONS

X. Fan, W. Gao, Y. Lu and . Zhao, "Flickering Reduction in All Intra Frame Coding," Joint Video Team (JVT) of ISO/IEC MPEG & ITU-TVCEG,JVT-EO70, 5th Meeting, Geneva, Oct. 2002.
S. Sakaida, K. Igushi, S. Gohshi and Y. Fujita., "Adaptive Quantization Reduction for Reducing Flicker of AVC/H.264 Intra Frames," Picture Coding Symposium, Dec. 2004.

\* cited by examiner

*Primary Examiner* — Christopher S Kelley
*Assistant Examiner* — Hee-Yong Kim
(74) *Attorney, Agent, or Firm* — Michael Blaine Brooks, PC; Pejman Yedidsion; David Ripma

(57) ABSTRACT

The embodiments of the present invention provide for methods, devices, and systems adapted to reduce flickers introduced in the encoding process, particularly during the generation of intra-coded pictures. The method provides for the determination of flicker areas within pictures and applying a flicker-control cost function, for example, on those determined flicker areas when selecting an intra-prediction mode.

31 Claims, 11 Drawing Sheets

INTRA-FRAME FLICKER REDUCTION IN VIDEO CODING

FIELD OF THE INVENTION

The embodiments of the present invention relate to flicker-control, particularly by applying a flicker-control cost function during the intra mode selection process.

BACKGROUND

A video encoder, e.g., a codec, may introduce flicker when operating at low bit rates. A flicker appears as a "pulse" or "jerk" within a video sequence, and is more perceptibly apparent in image regions with little or no motion. Several tools or video-coding processes within an encoding process may produce these flickering artifacts. For example, coarse quantization of the transform coefficients during the encoding process may introduce large deviations from the original image sequence and the loss of high frequency information and detail. Intra-prediction typically estimates pixel data within an image frame from previously decoded spatial neighbors. In some cases, this estimation propagates errors spatially throughout a frame, for example. These flickers furthermore, for example, may occur in videos with all intra-coded frames or those that have intra-coded and inter-coded frames combination. Although coarse quantization and intra-prediction mode selection and estimation are important for coding efficiency, these processes, however, may lead to flickering artifacts and deviations within an image sequence. Without proper management and control, these artifacts may hamper a user's viewing experience. Methods, systems, and devices that address or alleviate these situations are thus highly desirable.

SUMMARY

In one aspect of the invention, a method of encoding a video is provided. The video includes a plurality of pictures. The method includes the steps of receiving the plurality of pictures, and for each picture of the plurality of pictures, generating an intra-coded picture or an inter-coded picture. Each of the intra-coded picture includes a plurality of picture elements and each of the inter-coded picture also includes a plurality of picture elements. The step of generating the intra-coded picture also includes the steps of reconstructing each picture element of the plurality of picture elements; and if a current reconstructed picture element, of the reconstructed picture elements, is located in a flicker area, performing a flicker-control process adapted to select an intra prediction mode based on a flicker-control cost function. The flicker-control cost function is based on the reconstructed picture element of a previously reconstructed picture, the current reconstructed picture element, and an original picture element associated with the current reconstructed picture element. Furthermore, the reconstructed picture element of the previously reconstructed picture, the current reconstructed picture element, and the original picture element are collocated in the same location.

In another aspect of the invention, another method of encoding a video is provided. The video includes a plurality of pictures, with each picture including a plurality of picture elements. The method includes the steps of determining if each picture element of the plurality of pictures is a flicker area based on whether one or more collocated picture elements of one or more previously reconstructed pictures, relative to said each picture element, is a skipped picture element with zero motion; and selecting an intra prediction mode for said each picture element, wherein if said each picture element is determined a flicker area, the step of selecting the intra prediction mode minimizes a cost function based on a collocated previously reconstructed picture element from a reference picture.

In another aspect of the invention, a device adapted to encode a video is provided. The video includes a plurality of pictures with each picture comprising a plurality of picture elements. The device includes an intra mode selection module, an intra prediction module, a transformation module, a quantization module, and an entropy encoder module. The intra mode selection module is adapted to select, based on a flicker-control cost function, an intra prediction mode for a current picture element of the plurality of pictures. The flicker-control cost function is based on a reconstructed picture element of a previously reconstructed picture, a current reconstructed picture element of the current picture element, and the current picture element, and wherein the reconstructed picture element of the previously reconstructed picture, the current reconstructed picture element, and the current picture element are collocated in the same location. The intra prediction module is adapted to generate a predicted picture element based on the selected intra prediction mode. The transformation module is adapted to transform a residual picture element based on the generated predicted picture element and the current picture element. The quantization module is adapted to perform quantization on the transformed residual picture element. The entropy encoder module, on the other hand, is adapted to perform entropy encoding on the quantized transformed residual picture element to generate an encoded bit stream.

In another aspect of the invention, a system is provided. This system includes an encoding device and a decoding device. The encoding device is operably coupled to the decoder via a transport medium. The encoding device is adapted to encode a video comprising a plurality of pictures with each picture comprising a plurality of picture elements. The encoding device includes a flicker-tracking module, an intra mode selection module, an intra prediction module, a transformation module, a quantization module, and an entropy encoder module. The flicker-tracking module of the encoding device is adapted to track flicker areas based on whether the picture element has a zero motion vector and is a skipped picture element. The intra mode selection module is adapted to: if a current picture element of the plurality of picture elements is a flicker area, select, based on a flicker-control cost function, an intra prediction mode for the current picture element, and if the current picture element is not in a flicker area, select, based on a cost function, the intra prediction mode for the current picture element. The flicker-control cost function is based on a reconstructed picture element of a previously reconstructed picture, a current reconstructed picture element of the current picture, and the current picture element. Furthermore, the reconstructed picture element of the previously reconstructed picture, the current reconstructed picture element, and the current picture element are collocated in the same location. The cost function, on the other hand, is based on the current reconstructed picture element of the current picture and the current picture element. The intra prediction module, on the other hand, is adapted to generate a predicted picture element based on the selected intra prediction mode, while the transformation module is adapted to transform a residual picture element based on the generated predicted picture element and the current picture element. The quantization module is adapted to perform quantization on the transformed residual picture element, and the entropy encoder module is adapted to perform entropy encoding on the quantized transformed residual picture element to generate an encoded bit stream. Moreover, the decoding device is adapted to decode the encoded bit stream.

BRIEF DESCRIPTION OF THE DRAWINGS

The present invention is illustrated by way of example and not limitation in the figures of the accompanying drawings, and in which.

DETAILED DESCRIPTION

Figure 1:
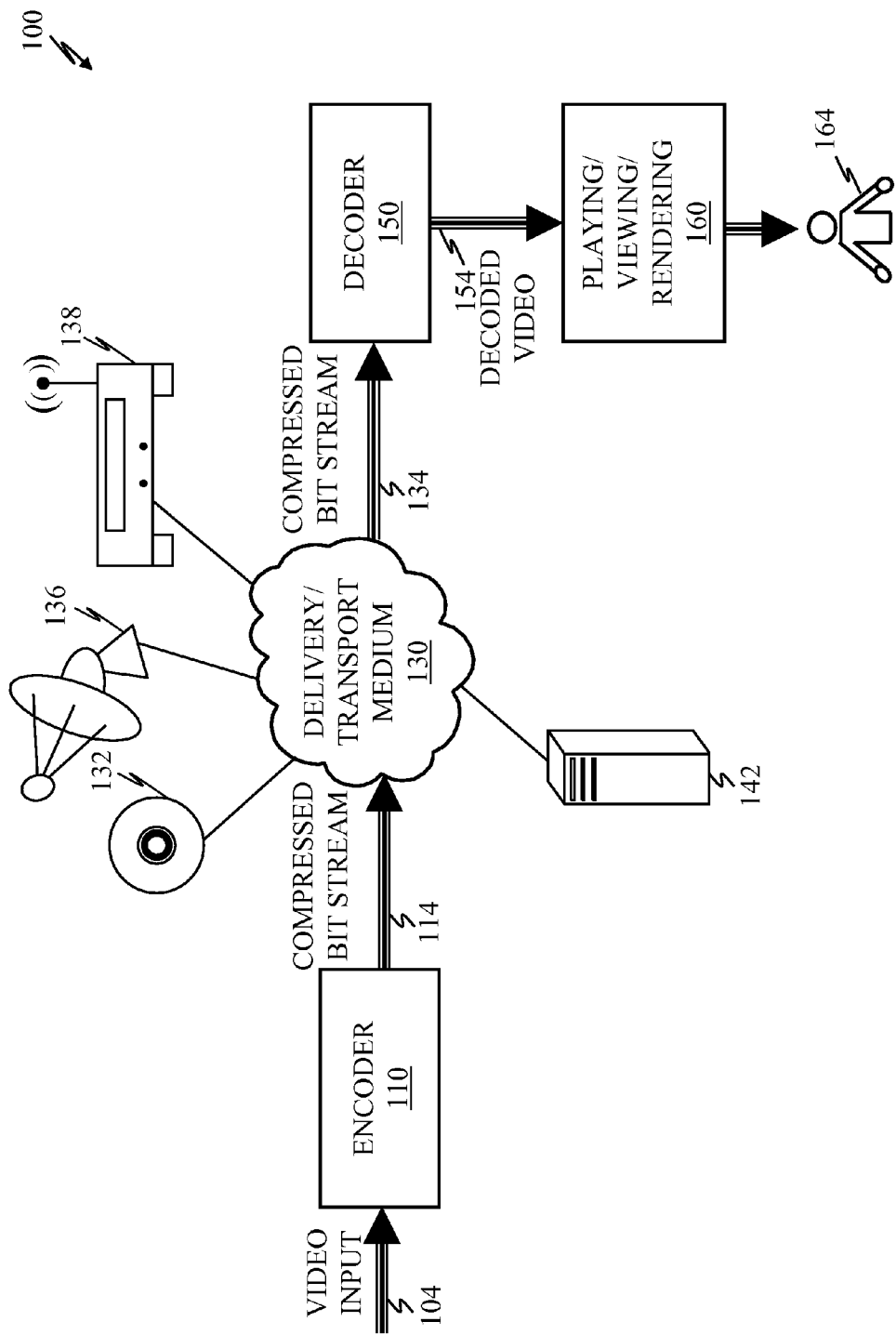
FIG. 1 is a high-level block diagram of an exemplary system according to an embodiment of the invention.
Figure 2:
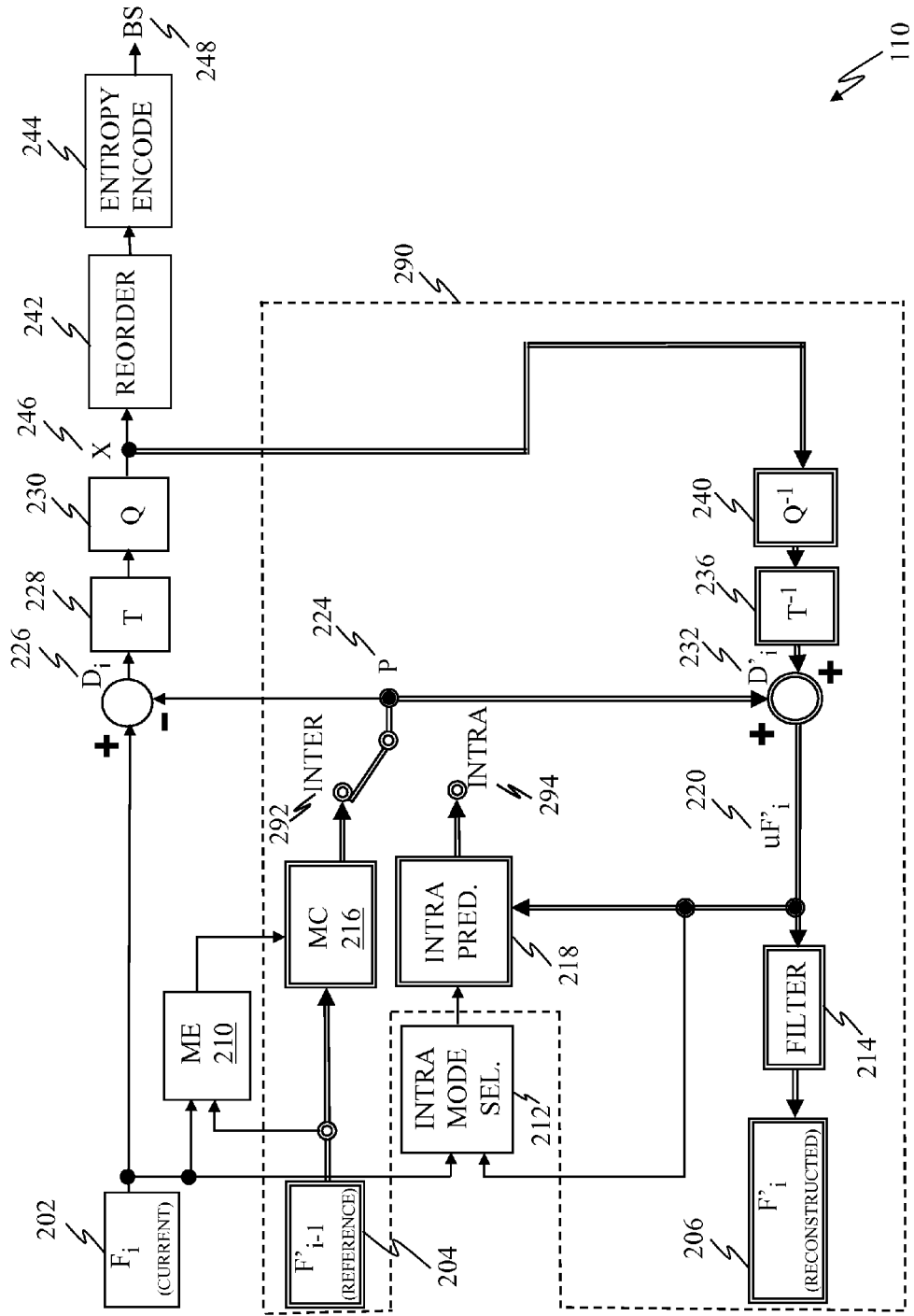
FIG. 2 is a high-level functional block diagram of an exemplary encoder according to an embodiment of the invention.

To better understand the figures, reference numerals within the one hundred series, for example, 104 and 110, are initially introduced in FIG. 1, reference numerals in the two hundred series, for example, 216 and 218, are initially introduced in FIG. 2, and so on and so forth. So, reference numerals in the six hundred series, e.g., 614 and 624, are initially introduced in FIG. 6.

The embodiments of the present invention are discussed in relation to systems, methods, and devices that may conform to the H.264/Advanced Video Coding (AVC) specifications or standards. H.264 has been adopted by the Moving Picture Experts Group (MPEG) standards to be a video compression scheme in the MPEG-4 format for digital media exchange. H.264/AVC video coding specification has been developed jointly by video codec experts from International Telecommunications Union (ITU) and International Standards Organization (ISO), and the standardization effort is also known by other names, including Joint Video Team (JVT), ITU-T H.26L, or ISO MPEG-4 part 10. The use of H.264/AVC is for exemplification purposes and to facilitate understanding of the various embodiments of the invention. The embodiments of the invention, thus, may apply to other video encoding and/or decoding processes and standards that apply intra-coding, particularly intra prediction.

The embodiments of the present invention generally relate to flicker-control or reduction, particularly reducing flickers introduced in the encoding process, e.g., within a video codec. This flicker reduction or control is typically performed by applying a flicker-control cost function associated with the intra mode selection process. In some embodiments, the flicker-control cost function is only applied to blocks, particularly macroblocks (MBs), within intra-coded pictures. In particular, the flicker-control embodiments described herein may apply to encoders performing intra-prediction, e.g., H.264-compliant encoders and decoders.

FIG. 1 is an exemplary system 100 according to an embodiment of the invention. The system 100 typically includes an encoder 110, a delivery or transport medium 130, and a decoder 150. The encoder receives video input signals 104, typically uncompressed, that are typically encoded and compressed by an encoder 110. In some embodiments, the encoder 110, the decoder 150, or both are embodied as codecs. A codec in general is a device or a set of program instructions, e.g., software, adapted to encode and decode a digital data stream or signal. A codec may be an audio codec, a video codec, or an audiovisual codec. A codec, compressor/decompressor, typically includes an algorithm that is used to compress the captured source content, e.g., video, into fewer bytes. By following the algorithm, applications such as encoders, decoders, and media players may reliably encode/compress and decode/decompress data. Data encoded by an encoder supporting the MPEG standard, for example, has to be decoded by a corresponding decoder adapted to support the appropriate MPEG standard. A codec may encode and/or decode a source content, e.g., video, into one or more compression schemes, e.g., MPEG-2 and MPEG-4.

The compressed bit stream 114 encoded and compressed by the encoder 110 is then typically transmitted via a delivery or transport medium 130. This transport/delivery medium 130 may include broadcast 136, e.g., cable, terrestrial, or satellite broadcast, a wide area network such as the Internet, and a wired and/or wireless medium. In other embodiments, the transport medium is a digital versatile or video disc (DVD) 132, a set-top box 138, or a media server 142. Other embodiments of delivering the compressed bit stream 114 are known to those of ordinary skill in the art. In some embodiments, the compressed bit stream 114, 134 may include other information, e.g., when packetized for transmission over the Internet. The compressed bit stream 134 is then received by the decoder 150, which then decodes the compressed bit stream to obtain a decoded video 154 for rendering or presentation 160 to a viewer 164, for example. The decoded video 154 may be rendered via various devices, for example, media players, cellular phones, personal digital assistants (PDAs), DVD players, computers, and information appliances.

FIG. 2 is a high-level functional block diagram of an exemplary encoder 110 showing exemplary functions according to some embodiments of the invention. For illustrative purposes, the exemplary encoder is described in relation with the H.264/AVC specification. In general, a video input 104 is divided into video elements or pictures. A coded video sequence in H.264/AVC typically consists of a sequence of coded pictures. A coded picture typically represents either an entire frame or a single field. In some embodiments, a frame of video may be considered to include two interleaved fields, a top field and a bottom field.

A picture is typically partitioned into fixed-sized MBs, with each MB covering a rectangular picture area of 16×16 samples of the luma component and 8×8 samples of each of the two chroma components. In general, MBs are the basic syntax and processing unit employed within H.264, particularly of the decoding process. A picture may also be partitioned into slices. A slice typically consists of one or more MBs. If not using flexible MB ordering (FMO), a slice is a sequence of MBs, which are processed in the order of a raster scan. Using FMO, patterns of MBs may be defined by using slice groups. An MB allocation map or an MB-to-slice-group map defines the slice group by having each slice group identified with a slice group identification number and indicating to which slice group an MB belongs. An MB may be associated with one or more slice groups. Each slice group may also be divided into one or more slices, such that a slice is a sequence of MBs within the same slice group that is processed in the order of a raster scan within the set of MBs of a particular slice group. The case where FMO is not employed, thus, may be viewed as a case of FMO in which the whole picture consists of a single slice group. A picture thus may be considered to be divided into picture elements, where these picture elements may be further sub-divided into other picture elements.

One of ordinary skill in the art will appreciate the possible variations of representing videos, as well as the manner of partitioning and size variations. For illustrative purposes, the picture herein is exemplified in relation with frames. The embodiments of the invention, however, may apply to fields and other processing units or picture element definitions. In some embodiments, the basic processing unit of the encoding or decoding process is the MB, which may be a picture element.

Regardless whether FMO is employed or not, each slice may be inter-coded or intra-coded. Intra-coding, in general, relates to coding without using information other than the information contained in the picture itself-no reference picture. Each MB in an intra frame, for example, is also typically intra-predicted using spatial prediction by analyzing neighboring samples of previously coded MBs. The first picture of a video sequence or a random access point is typically intra-coded. For remaining pictures of a sequence or typically between random access points, inter-coding is typically employed. Inter-coding, unlike intra-coding, employs one or more previously encoded reference pictures. Inter-coding employs temporal prediction, particularly motion compensation, from other previously decoded pictures.

There are several types of exemplary slice coding types. An I-slice is an example of an intra-coded or intra-predicted slice, while a P-slice and a B-slice are examples of inter-coded or inter-predicted slice. In an I-slice, all MBs are coded without referring to other pictures within the video sequence-no reference picture. The MBs in an I-slice or intra-slice may are typically coded using intra spatial prediction. To exploit spatial correlation among pixels or MBs within a frame, three exemplary types of intra-prediction/intra mode selection process are currently defined in the H.264 specification: full MB prediction for 16×16 luma or the corresponding chroma block size, 8×8 luma prediction (FRExt-only), or 4×4 luma prediction. In the INTRA-4×4 mode, for example, each 4×4 block of the luma component utilizes or applies one of nine intra prediction modes or intra modes, typically based on previously decoded pixels in blocks to the left and/or above the current block being processed. Each intra mode generally corresponds to a prediction direction. Four intra modes are currently available for a 16×16 luma MB. In some embodiments, an I_PCM coding type enables an encoder to simply bypass the intra spatial prediction and transform coding processes and instead directly send the values of the encoded samples. This enables, for example, the encoder to precisely represent the values of the samples. Intra prediction as described herein includes the I_PCM coding type, which generally skips the intra-spatial prediction aspect. Thus, an intra-slice may include intra predicted MBs and those generated, e.g., as an I_PCM coding type.

Part of the intra prediction mode selection process 212 is the selection of the intra mode. In the exemplary encoder 110 embodiment of the present invention, the intra prediction mode selection process 212 is based on minimizing the value of a flicker-control cost function, further discussed below, which generally considers the distortion between the current reconstructed MB and the reconstructed MB collocated in the previous frame. The exemplary encoder of the present invention is compatible with existing standards, particularly with H.264/AVC. P-slices and B-slices, on the other hand, typically utilize previously coded pictures to form an inter prediction, i.e., utilize reference pictures.

Inter temporal prediction 292 is typically employed using motion estimation 210 and compensation 216. A P-slice typically is coded with at most one motion-compensated prediction signal per prediction block, while a B-slice typically is coded with at most two motion-compensation prediction signals per prediction block. An MB may be further subdivided into sub-blocks for motion-compensated prediction. In general, a P-slice and a B-slice each may contain intra-coded MBs, including those coded as an I_PCM coding type, and/or MBs coded using inter temporal prediction. H.264 also supports SP-slices (switching P) and SI-slices (switching I), which are in general coded for efficient switching between different bit streams coded at various bit-rates.

The video coding layer of H.264/AVC in general consists of a hybrid of temporal and spatial prediction, in conjunction with transform coding. In general, input video or signals 104 are received by the exemplary encoder 110. The input video signal is typically divided into MBs, the association of MBs to slice groups and slices is defined/selected, and then each MB of each slice is typically processed as shown, for example, in FIG. 2.

The exemplary encoder 110 typically includes two data-flow paths, a "forward" path 202, 226, 228, 230, 242, 244, 210, 212 shown typically connected by single-line arrows, and a "reconstruction" or decoding path 204, 216, 218, 224, 232, 236, 240, 246, 214, 206 typically connected by double-line arrows. The reconstruction path or process is outlined generally in the dashed area 290. This reconstruction or decoding process is typically performed to conduct prediction and reconstruction for the next MBs. Although an exemplary encoder 110 block diagram is shown in FIG. 2, the decoder 150 conceptually works in reverse, consisting generally of an entropy encoder 244 and the processing elements defined within the dashed region 290.

To illustrate, the forward path, for example, let us assume that a current input picture 202, for example, a frame, $F_i$, is presented for encoding. The current input frame 202, $F_i$, is typically processed in units of a MB, e.g., corresponding to 16×16 pixels in the original frame. Each MB is typically encoded in intra 218, 294 or inter mode 216, 292. Previously encoded frame 204, $F'_{i-1}$, is typically stored in a data store and may be used as a reference frame. In some embodiments, two or more previously encoded frames 204 are stored, so as to enable an inter-coded slice or MB to have more than one reference. In intra mode, the prediction MB, P, 224 is typically generated from samples in the current frame i that have previously been encoded, decoded, and reconstructed. In some embodiments, only samples within the current slice are available for prediction. Typically, unfiltered samples, represented by $uF'_i$ 220 are used to generate P. In general, the intra prediction mode selection process 212 selects a prediction mode for each MB that typically minimizes the difference between the prediction MB and the MB to be encoded. In inter mode 292, P is generated by motion estimation 210 and motion compensation prediction 216 from one or more previously encoded reference frames $F'_{i-1}$ 204. These reference frames, although previously encoded and reconstructed, however, may be past and/or future frames, in time order presentation sequence.

A prediction MB 224, P, is generated based on a reconstructed frame, typically regardless whether the MB is intra or inter mode. The prediction MB 224, P, e.g., based on the prediction mode selected, is subtracted from the current MB in $F_i$ 202 to obtain a residual of the prediction, $D_i$ 226, which is then transformed 228, typically by block transformation and integer transformation. The transform coefficients are typically quantized 230 to provide a set of quantized transform coefficients X 246, which is typically reordered 242 and entropy encoded 244. Entropy encoding 244 in general is a coding scheme that assigns, for example, codes to symbols so as to match code lengths with the probabilities of the symbols. Defined in another way, entropy coding refers to a coding technique or process that replaces data elements with coded representations, which typically results in reduced data size. Entropy coding may include mapping symbols representing motion vectors, quantized coefficients, and MB headers into actual bits.

The entropy encoded coefficients and any other side information, including information for appropriate decoding, are typically sent as a compressed bit stream 248, 114. Such side information may include MB prediction mode, quantization control parameter, and motion vector information indicating the manner of motion compensation, e.g., partition size.

The exemplary encoder 110 typically also includes a decoder function 290, shown by the reconstruction path, so as to enable prediction for the next MBs or the next picture. The quantized transform coefficients X 246 are inverse scaled Q-1 240 and inverse transformed T-1 236 resulting in a decoded prediction residual or difference MB 232, D'i. Typically, this decoded prediction residual 232, D'i, is different from the original difference Di 226 considering that the quantization process may introduce losses and thus D'i 232 may be a distorted version of Di 226. The decoded prediction residual D'i 232 is added to the prediction MB P 224 to generate a reconstructed MB uF'i 220 typically a distorted version of the original MB, which is then passed through a filter, e.g., a de-blocking filter, 214 adapted to reduce the effects of blocking distortion. Block-based video coding typically produces artifacts known as blocking artifacts. These artifacts may originate from both the prediction and residual difference coding stages of the encoding process. The result is a reconstructed reference frame F'i 206 created from a series of MBs.

One of ordinary skill in the art will appreciate that the modules and functions described in this exemplary encoder may be further subdivided, combined, and/or varied and yet still be in the spirit of the embodiments of the invention. The various modules may also be implemented in hardware, software, or both, i.e., firmware.

Figure 3:
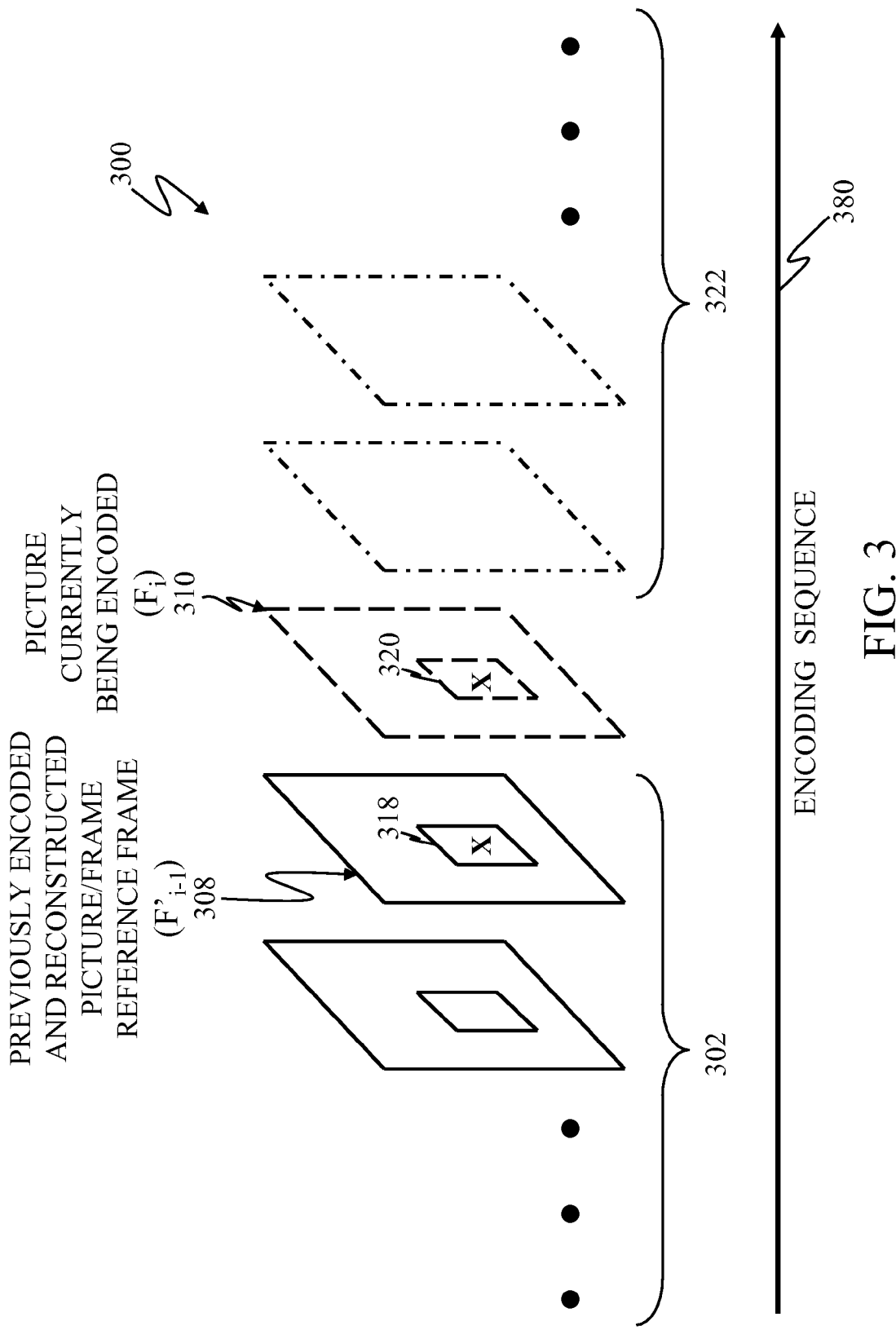
FIG. 3 is an exemplary video sequence according to an embodiment of the invention.

FIG. 3 is a high-level diagram illustrating an exemplary video represented as a series of video elements or pictures 300. Pictures, herein, may include frames or fields, for interlaced videos, and any other video element. In this exemplary embodiment, the pictures are exemplified as frames for illustrative purposes only. In this exemplary encoding sequence 380, frame 308 is a previously reconstructed frame ($F'_{i-1}$) 308, 204 stored typically in a data store, which may be used as a reference picture; while $F_i$ 310 is the current video input picture or frame 310, 202 currently being reconstructed and encoded. The previously reconstructed reference frame 308 may be intra-coded or inter-coded. Other input frames 322 are yet still to be encoded. Other frames 302 have been previously encoded and reconstructed and some may be used as reference frames. The MB 318 in the previously reconstructed frame 308 is collocated in the same MB 320 location of the currently processed input frame 310.

Figure 4:
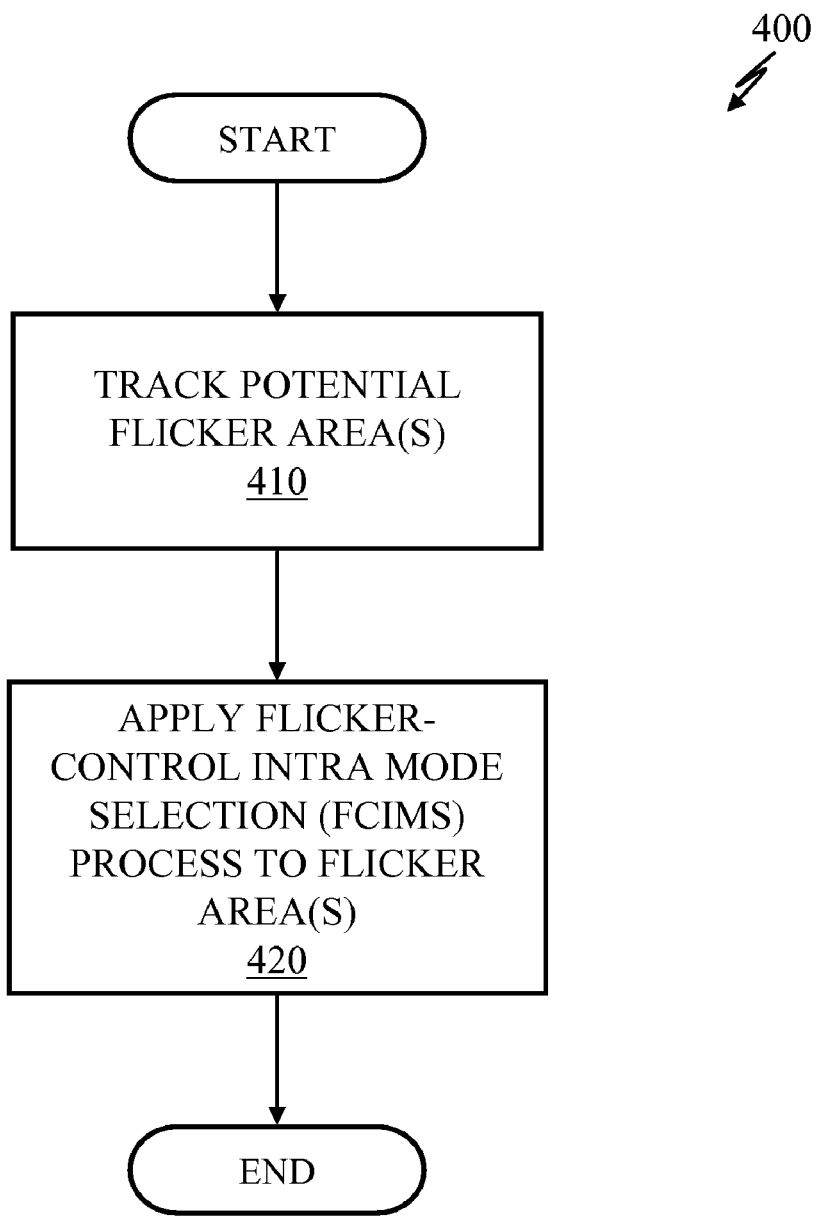
FIG. 4 is a high-level flowchart showing an exemplary flicker-control process according to an embodiment of the invention.

FIG. 4 is a high-level flowchart showing an exemplary flicker-control process 400 according to some embodiments of the invention. The exemplary process 400 is typically adapted to reduce flicker artifacts typically caused by spatial intra predication and/or coarse quantization in the encoding process. The embodiments of the invention may apply to intra-coded pictures as well as to cyclical inserted intra pictures in motion compensated ones. In some embodiments, the flicker-control process 400 tracks or identifies the potential flicker area(s) within a picture, e.g., a frame (step 410). A flicker-control intra prediction mode selection (FCIMS) process is then applied to the tracked flicker areas (step 420).

Figure 5:
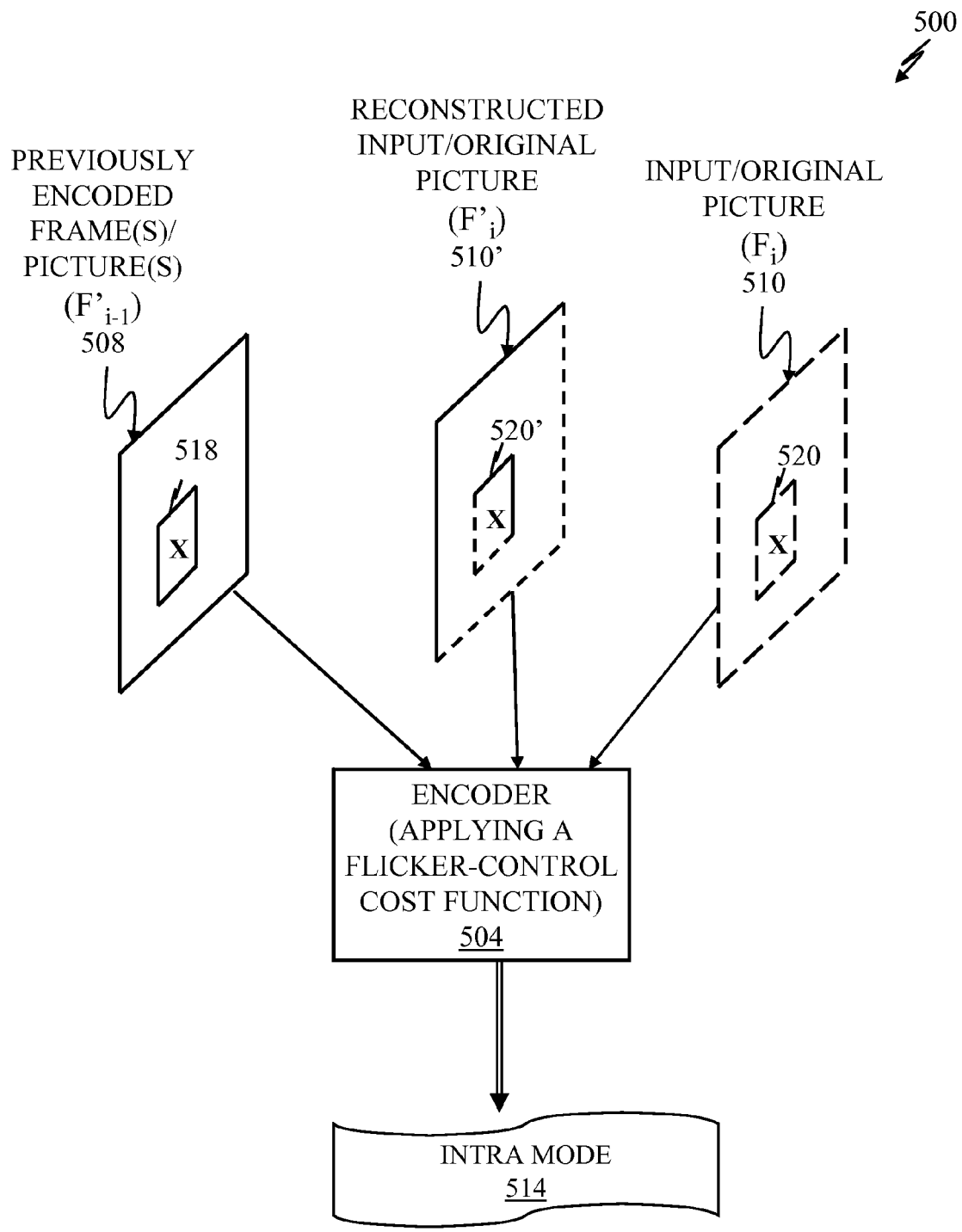
FIG. 5 is a high-level exemplary data flow diagram according to an embodiment of the invention.

FIG. 5 is a high-level block diagram illustrating an exemplary data flow 500 according to some embodiments of the invention. In general, the embodiments of the invention relate to modifying conventional intra-prediction mode selection process, within an encoding process, by utilizing a revised cost function, herein also referred to as the flicker-control cost function, and having a quantization control parameter adapted to minimize flickers. The embodiments of the invention are adapted to be compliant with existing H.264 standards.

In general, the intra mode selection process calculates the cost, based on a flicker-control cost function, for every available intra mode or for a subset of available modes, and then chooses the intra mode typically resulting with the minimum cost value. Intra prediction, as mentioned above, relates to encoding a MB based on a prediction from the pixels in the previously encoded adjoining MBs. In general, an encoder typically selects the intra prediction mode for each MB that minimizes the difference between the prediction MB 224, P, and the MB being encoded—MB of Fi 202. The exemplary intra mode selection process 212 of the present invention, in addition to typically considering the difference between the reconstructed current MB of F'i 206, 510' and the input or original current MB of Fi 202, 510, also considers the difference between the collocated MB of a previously reconstructed frame F'i-1 204, 518 and the current reconstructed collocated MB of F'i 206, 520'. The previously reconstructed frame 204, 508, F'i-1, is typically the reconstructed frame in the encoding sequence that temporally precedes the current frame in display order, however, other previously reconstructed frames, F'i-n, may also be used. For example, let us assume that the MB 520 of the current picture 510, 202 is currently being intra-predicted. The flicker-control cost function thus considers the difference between the input or original MB 520 and the reconstructed version of that MB 520' when using a candidate intra mode, and the difference between the reconstructed MB 520' and the reconstructed MB 518 of a previously encoded and reconstructed frame F'i-1 508. The various MBs 520, 520', 518 are collocated with each other. Based on minimizing the cost of the flicker-control cost function 504, the appropriate intra mode 514 is selected, e.g., mode 5 (vertical right) of INTRA_4×4, so as to determine the appropriate predicted MB 224.

Figure 6:
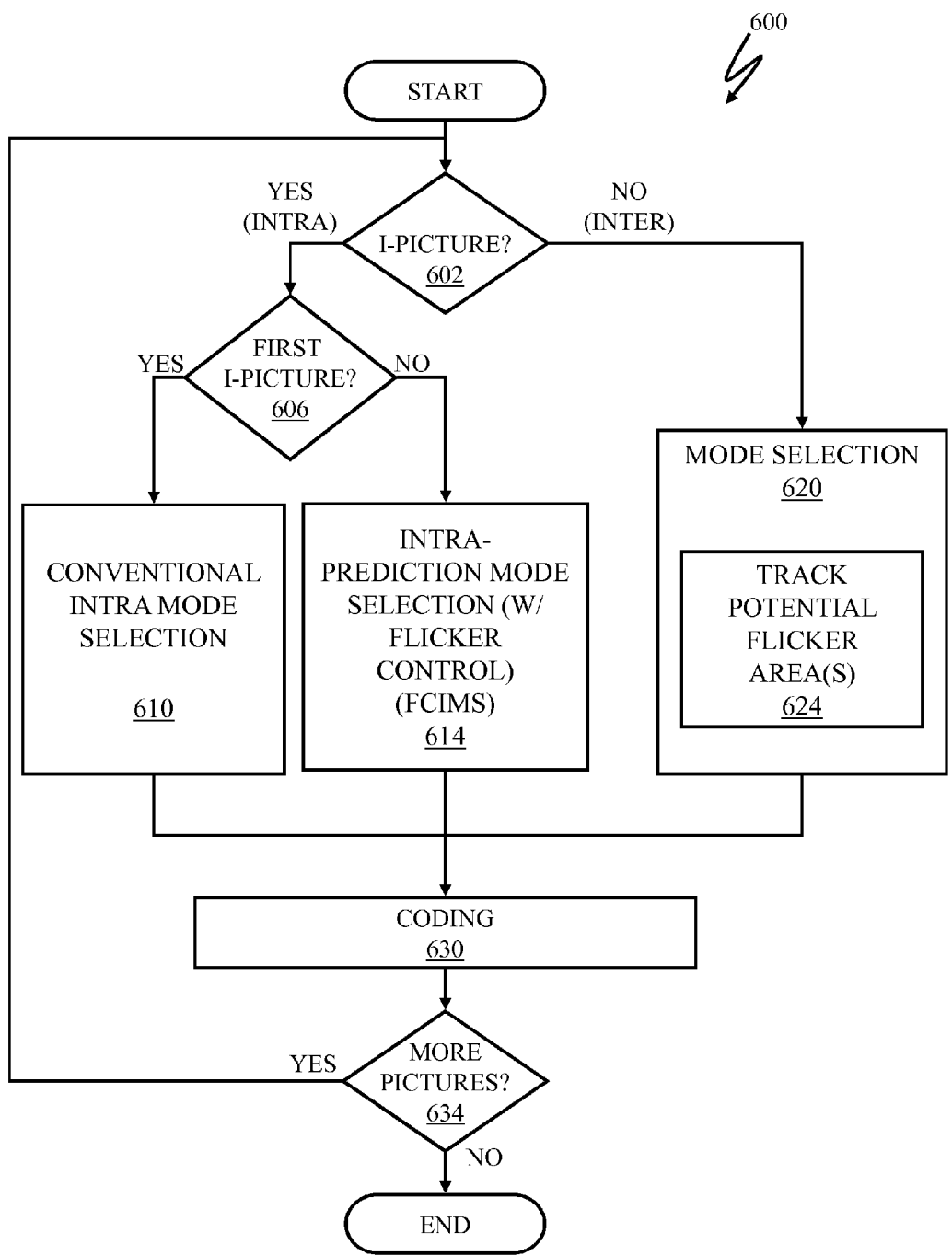
FIG. 6 is a more-detailed flowchart of an exemplary flicker-control process according to an embodiment of the invention.

FIG. 6 is a more-detailed flowchart of FIG. 4 showing an exemplary flicker-control process 600. In general, the flicker-control process identifies areas that potentially may have a flicker condition meeting a defined condition. For these potential areas, the process typically utilizes information available from previously encoded pictures to identify the potential flicker, e.g., the flicker-control process 600 considers the last or the most recently reconstructed P-frame to control the intra mode selection of the current intra frame.

As discussed above, a picture may contain many slices. An intra-slice typically contains only intra-coded MBs, while an inter-slice may contain both inter-coded and intra-coded MBs. In general, a determination is made as to whether the picture, e.g., frame, is to be intra-coded or inter-coded (decision 602). An intra-coded picture typically contains intra-coded slices, while inter-coded pictures may contain intra and/or inter-coded slices. Intra-coded slices typically contain intra-predicted or intra-coded MBs, while an inter-coded slice may contain any combination of inter-predicted and intra-predicted MBs. The basic processing unit in this exemplary embodiment is by MB.

Typically, the first I-picture in a video sequence is coded in a conventional manner. This means that the intra-prediction mode selection process applied in the first intra-coded frame, or in some embodiments, to random access points, may be encoded using conventional or available intra-prediction mode selection process (step 610). Such conventional intra-prediction mode selection process may include those defined in the H.264 JM reference software, which in general defines a cost function that is based on minimizing the difference or distortion between the current reconstructed MB 206 and the original current MB 202. An example of such cost function is cost=Distortion$_i$+Bias (see Equation 1, below). This first I-picture is then coded (step 630). If this picture, however, is not the first I-picture, the flicker-control intra-prediction mode selection (FCIMS) process (step 614) is performed, which typically utilizes a different cost function than the conventional intra-mode selection process (step 610). The I-picture is then accordingly coded (step 630). This coding process (step 630) generally means that the appropriate residuals 226 are transformed 228, quantized 246, reordered 242, and entropy coded 244. In general, an appropriate bit stream 248 is then generated. The exemplary flowchart is a very high-level flowchart, showing a process in a picture level.

If the picture, however, is to be processed as an inter-coded picture (decision 602, "NO" branch), appropriate mode selection is performed (step 620). This mode selection process may include inter-mode selection or intra-mode selection (step 620), considering that inter-slices within an inter-coded picture may contain intra-coded MBs, inter-coded MBs, or both. Inter-prediction and/or intra-prediction mode selection may be performed. In some embodiments, the flicker-control process 600 detects the areas likely to have flickering artifacts and applies the FCIMS process 614 to those areas only. This tracking or identification of potential flicker area(s) (step 624) is performed in order to reduce additional computational resource and delay, and/or to avoid inadvertent performance degradation.

This inter-picture processing, however, is generally different from conventional inter-coded picture processing, considering that an additional function, a flicker-tracking function, is performed. This additional function typically tracks or identifies potential flicker area(s) for use by the next intra-picture or intra-frame (step 624). This flicker-tracking function or module (step 624) may be separate or integrated with the mode selection process (step 620). The inter-coded picture is then typically encoded and compressed, e.g., transformed, quantized, reordered, and entropy encoded (step. 630), typically at a slice level. If more pictures in the video sequence are still to be processed (step 634), the process is typically repeated as shown. In some embodiments, not shown, the flicker-tracking function (step 624) is not performed. The FCIMS process (step 614) may then be performed on some or all MBs in the picture, e.g., randomly or based on defined conditions. Other conditions determining when the FCIMS process is to be performed may also be implemented.

Figure 7:
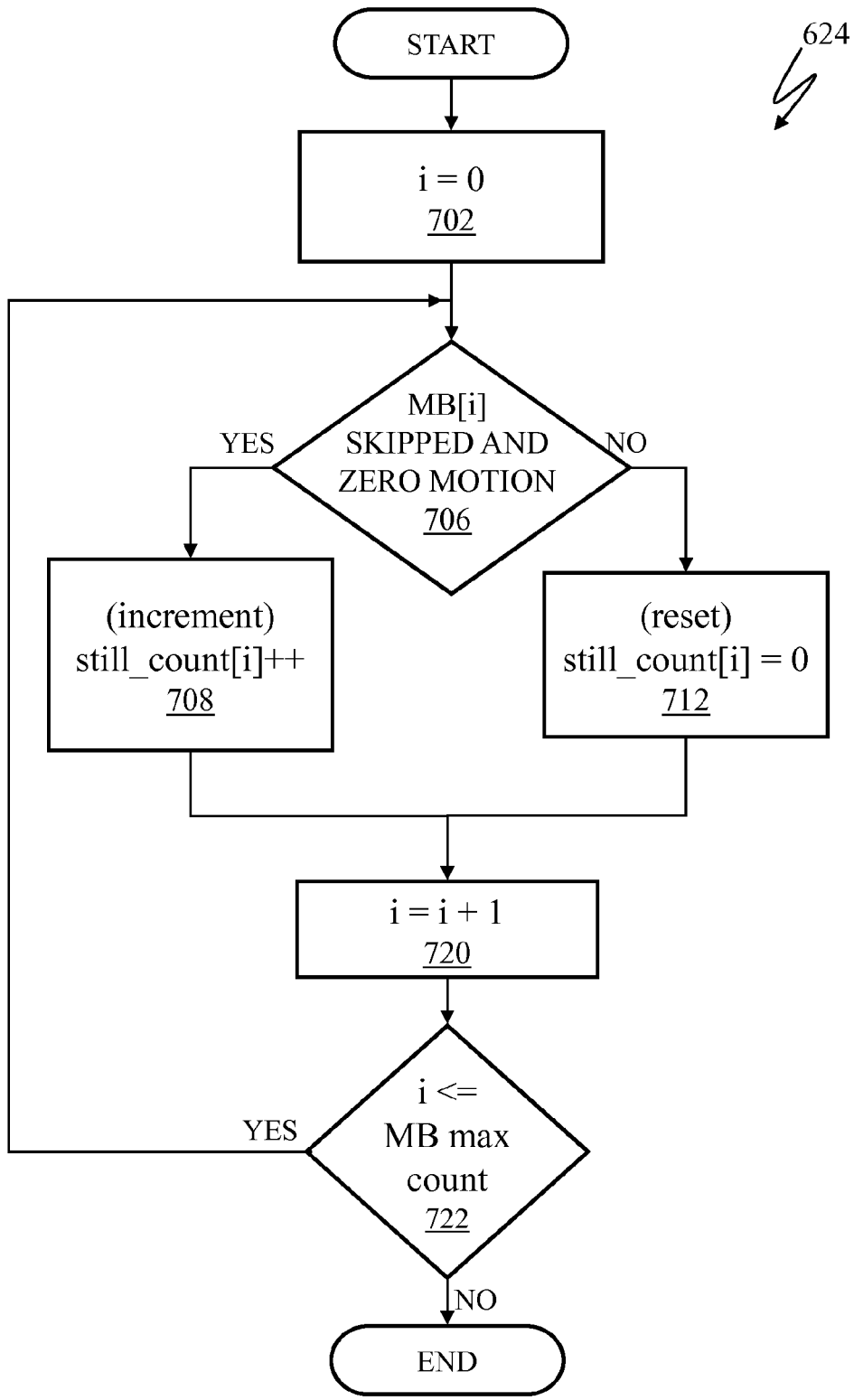
FIG. 7 is a high-level flowchart of an exemplary flicker-tracking module according to an embodiment of the invention.

FIG. 7 is a flowchart of an exemplary flicker-tracking module or process (step 624), according to some embodiments of the invention. In general, the flicker-tracking module tracks the locations in the video sequence with a large number of skipped MBs and no motion. In this exemplary embodiment, a frame consists of a number of MBs. Each MB in the picture is designated as MB[i] in the exemplary flowchart, where i, an index, is set to zero (0), and the maximum number of MBs in the picture is defined as an MB max count. In general, each MB[i] is processed and is associated with a location in the frame. The exemplary flicker-tracking module (step 624) typically initializes i to the value of zero (step 702). Each MB[i] is associated with a still_count[i], which generally functions as a flicker-reduction flag. Although the embodiments of the present invention utilize an array or memory space with the size typically related to the maximum number of MBs per picture, the embodiments of the invention, however, do not generally require additional picture buffer space. One of ordinary skill in the art will realize that the still_count[i] array has to be properly initialized. The embodiments of the present invention may be embodied in hardware and resource-constrained devices, e.g., cell phones enabled with a video capture and player device.

Areas likely to have flickering artifacts are typically steady, with no motion, areas with some line structures. Typically, a steady but smooth area would not have flickering artifacts. An MB may be a skipped MB, when the MB is going to be coded using a previously reconstructed MB, e.g., retrieved from memory. For example, an MB of the current frame being processed is skipped if the MB contains almost identical pixel information to that of a corresponding MB in a previous reconstructed frame(s), e.g., in areas representing a static background. In some embodiments, these skipped MBs are identified with a SKIP mode. In general, a skipped MB may correspond to a MB at a different location in the previous reconstructed picture. The embodiments of the present invention, however, checks if the MB[i] is a skipped MB and if MB[i] is a MB collocated with the previous reconstructed frame or picture; e.g., whether the MB[i] is skipped and has a zero motion vector (step 706).

If the MB[i] in the currently processed inter-coded picture or slice is identified as skipped and has zero motion, the still_count[i] is incremented, typically by one (step 708). The still_count[i] thus generally tracks the number or count of contiguous inter-coded frames—contiguous in an encoding sequence—with corresponding skipped and zero motion MB[i]s. If the current MB[i] being processed, however, has a non-zero motion or is not skipped (step 706, "NO" branch), the still_count[i] associated with that MB[i] is reset typically to a zero value (step 712). The i value is then incremented by one (step 720) to process the next MB in the frame. This process is typically repeated until all the MBs in the picture are processed (step 722). In some embodiments, other conditions may reset the still_count[i] counter or flicker reduction flag, e.g., external processes that signal the presence of a scene cut or a scene change may trigger the still_count[i] to be reset (step 712). One of ordinary skill in the art will appreciate that there are algorithms or processes currently available which may indicate a scene cut or change. Furthermore, in addition to the condition exemplified herein, e.g., step 706, other conditions may be defined to modify the still_count value. For example, the flicker-tracking module may increase the still_count[i] value when high-frequency components in a MB are encountered, considering that flickers may be more noticeable in areas with significant texture.

Figure 8:
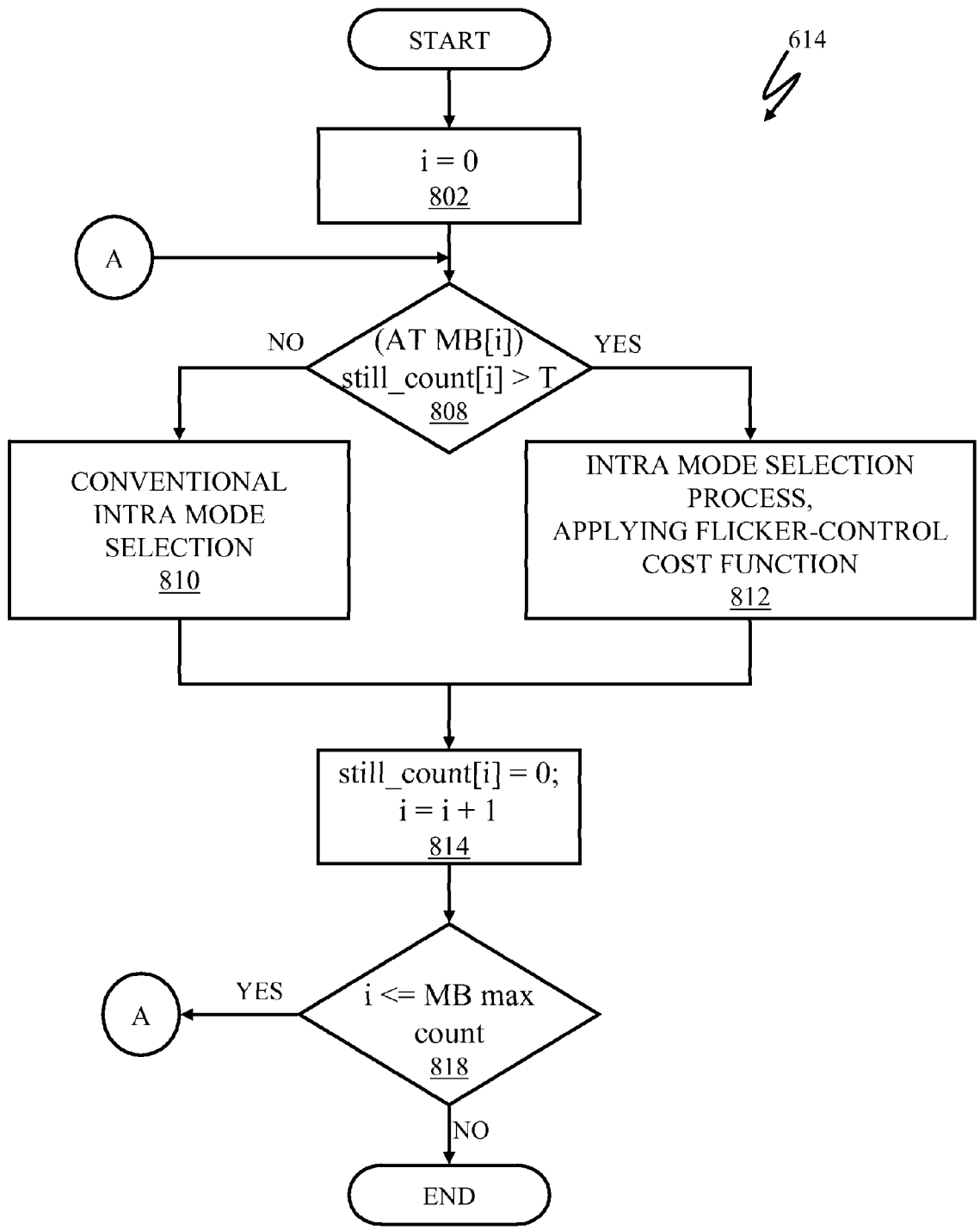
FIG. 8 is a high-level flowchart of an exemplary flicker-control intra-prediction mode or intra mode selection process according to an embodiment of the invention.

FIG. 8 is an exemplary FCIMS process (step 614), applied to flicker areas, according to some embodiments of the invention. In the first operation, an index i value is initialized to zero (step 802). In general, a check is made as to whether the associated still_count[i] of the MB[i] contains a value greater than a threshold condition, T. In general, this is a check determining whether the location of the MB[i] is a flicker area based on the defined flicker condition (step 808). In general, T is between 1 and the number of inter-coded pictures in between I-pictures. For example, if the group of pictures (GOP) structure is IBBPBBP with GOP size equals 15, T may be defined between 1 and 14, where 14 is the number of inter-coded frames before the next I-frame or GOP. T may be adjusted, for example, to adjust the flicker threshold. If the still_count[i] is greater than a defined threshold, the flicker-control cost function is applied in the intra mode selection process (step 812). Otherwise, a conventional intra mode selection process is applied (step 810). Still_count[i] is then reset to zero and i incremented by one (step 814). This process is repeated until all the MBs in the frame are processed (step 818).

The flicker-control process of the present invention may also be applied to fast intra mode prediction algorithms, by replacing the cost function in the fast intra prediction algorithm with the exemplary flicker-control cost function (see Equation 2 below). The fast intra mode prediction algorithm may include those incorporated into the exemplary H.264 reference software.

Figure 9:
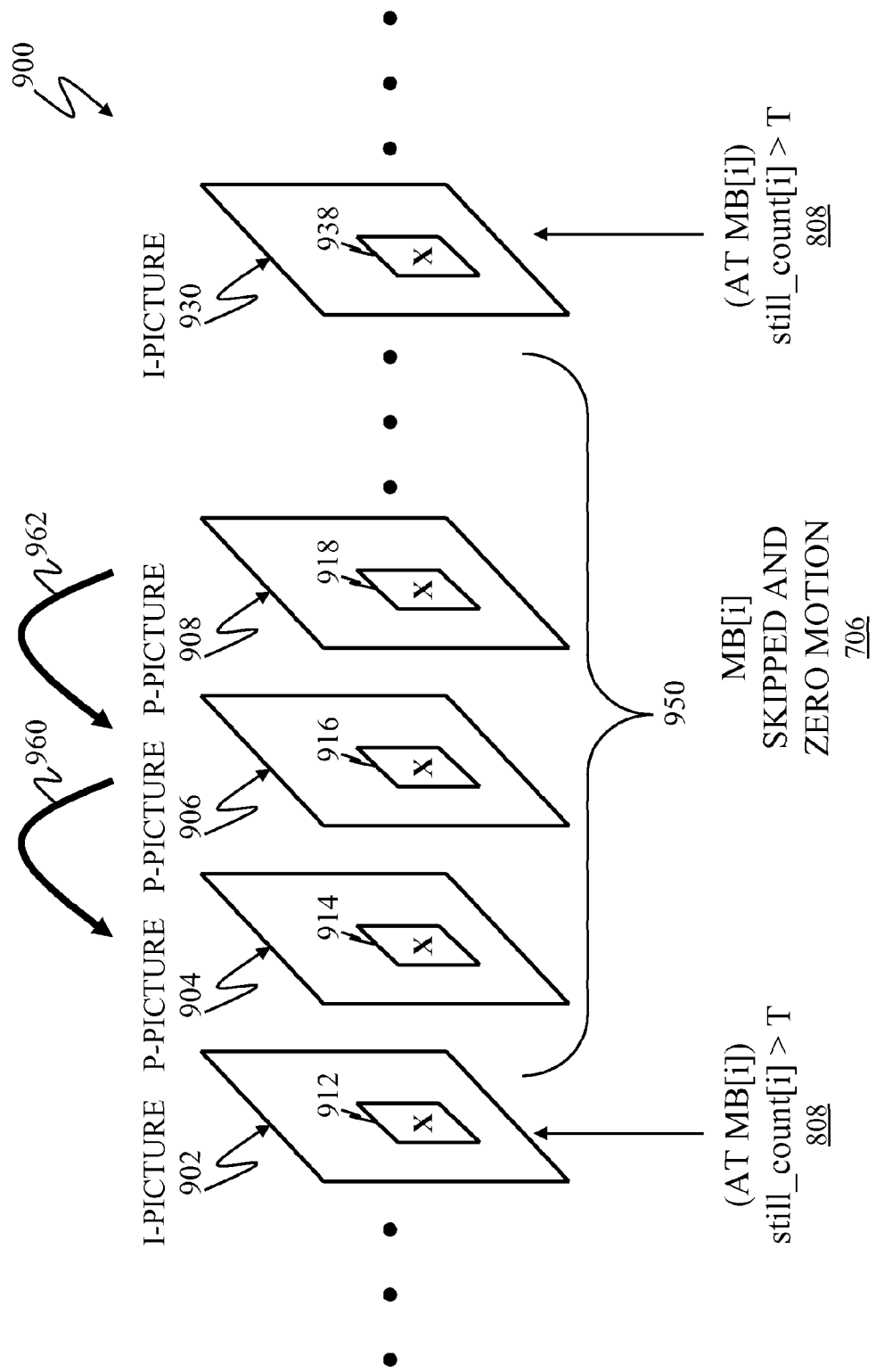
FIG. 9 is an exemplary portion of an exemplary video sequence, according to an embodiment of the invention.

FIG. 9 is an exemplary portion of a video sequence 900, which includes an intra-coded I-picture 902, followed by a number of inter-coded pictures, e.g., P-pictures 950, 904, 906, 908, and followed by another I-picture 930. The MB in each picture 912, 914, 916, 918, 938 are collocated with each other. The inter-coded pictures 950, 904, 906, 908 are exemplified as P-pictures. In relation to FIGS. 6-8, the flicker-tracking function is typically performed during the encoding process of the intra-coded pictures 950. At MB[i] 914, 916, 918, for example, a determination of whether the MB[i] is a skipped MB with zero motion (step 706) is performed and the appropriate still_count[i] is updated accordingly, based on whether the condition is satisfied. For example, if the picture currently being processed is the second P-picture 906 from the I-picture 902, the flicker-tracking module generally then checks if the MB[i] 916 is a skipped MB with zero motion in relation to the collocated MB 914 of the previously, typically, the last previously encoded and reconstructed picture 904. Similarly, when the third P-picture is processed, the determination is based on the last previously encoded and reconstructed picture 906, 916.

Flicker-Control Cost Function:

A conventional intra-prediction mode selection process (step 610) typically selects the intra-prediction coding mode for each MB by minimizing the following cost function:

$$\text{cost} = \text{Distortion}_i + \text{Bias} \quad (1)$$

where $\text{Distortion}_i$ measures the distortion relative to the original MB of $F_i$ 202. This distortion is typically computed as a Sum of Absolute Difference (SAD) or a Sum of Absolute Transformed Difference (SATD) of the prediction difference. Other functions to compute distortion may also apply. The Bias is typically equal to $\lambda \cdot \text{Rate}$, where $\lambda$ is a Lagrange multiplier and Rate is the coding bit rate. In low-complexity mode selection process where rate information is not available, Bias may be set to a number that is related to the prediction mode and a Quantization Parameter (QP) that favors prediction modes that utilize fewer bits to be signaled. For example, in a 16×16 intra prediction mode, the Bias may be set to Bias=0 to favor 16×16 intra prediction mode, while for a 4×4 intra prediction mode, the Bias may be set to $\text{Bias} = \lambda[\text{Qp}] \cdot \text{cost}_{4 \times 4blk}$, where $\text{cost}_{4 \times 4blk}$ is a predefined constant and $\lambda[\text{Qp}]$ is an item from a constant array. Generally, the QP may be scaled so as to control the trade-off between bit rate and quality The FCIMS process of the present embodiment of the invention, however, applies a cost function also considering the distortion or distance of the current reconstructed block or MB relative to the previously reconstructed collocated block, thereby to some extent constraining the current block to look like or be similar to the previously collocated block, even though the previous block 318 may be intra-coded or inter-coded. An exemplary flicker-control cost function is as follows:

$$\text{cost} = \alpha \cdot \text{Distortion}_i + (1-\alpha) \cdot \text{Distortion}_{i-1} + \text{Bias} \quad (2)$$

where $\alpha$ is a weighting factor between 0 and 1. In some embodiments, there is no restriction that $\alpha$ be a constant across an entire frame or sequence of frames. The variable $\alpha$ thus may have multiple values within the frame or between frames. Furthermore, $\text{Distortion}_{i-1}$ of the previous frame may be represented by the following equation:

$$\text{Distortion}_{i-1} = c \cdot SAD(R_i, R_{i-1}) \quad (3)$$

where $R_i$ or $MB_i$ is the reconstructed current block, $R_{i-1}$ or $MB_{i-1}$ is the reconstructed block collocated in the previous frame, and c is a scaling factor to make the $\text{Distortion}_{i-1}$ match, including substantially match, the magnitude of $\text{Distortion}_i$. The scaling factor c is applied so as reuse or reapply the original bias since the Bias was originally set to work with $\text{Distortion}_i$, which may be derived in a manner other than SAD, e.g., using SATD.

At coarse quantization, the quantization error is typically significant. The embodiments of the present invention utilize a reconstructed image applying a flicker-control distortion measure, $$\text{Distortion}_i = c \cdot SAD(R_i, O_i) \quad (4)$$

where $O_i$ is the original current block.

For the areas that need flicker reduction, the FCIMS process generally searches all the available prediction modes, or subsets thereof, and chooses a mode that minimizes the cost function in Equation (2), above. This process typically generates a reconstructed image visually similar to the preceding frame thereby reducing flicker. The embodiments of the present invention may also be applied to fast-intra prediction algorithms by replacing the cost function in conventional fast intra prediction algorithms with the exemplary flicker-control cost function, equation (2) above.

Figure 10:
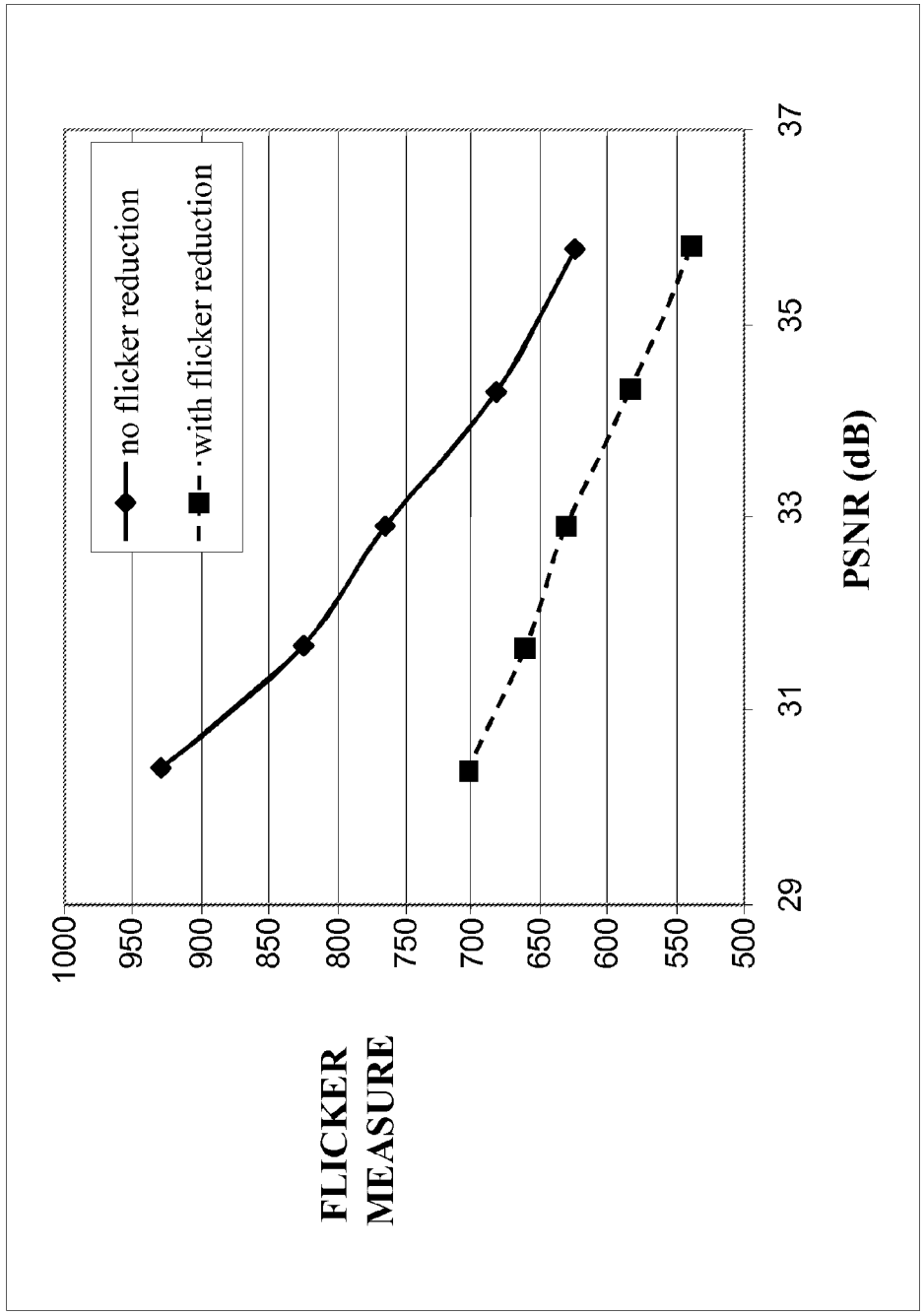
FIGS. 10 and 11 show exemplary graphs of an experimental test showing results of a conventional encoder and an encoder applying the exemplary flicker-control process according to an embodiment of the invention.
Figure 11:
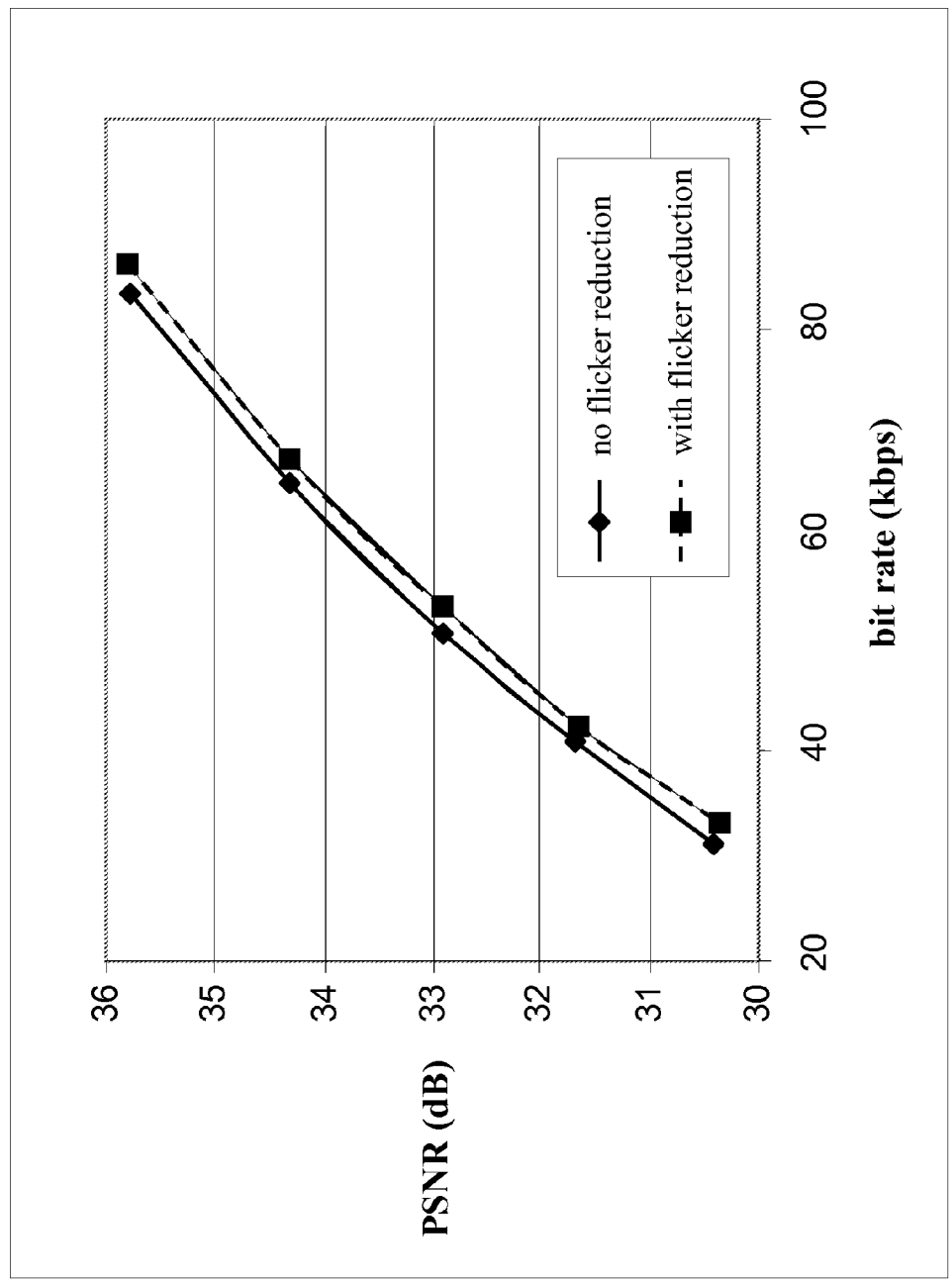

Experimental Test Result:

FIGS. 10 and 11 show exemplary results of a test conducted using the exemplary FCIMS process described herein. FIG. 10 shows the measured flicker versus the Peak Signal-to-Noise Ratio (PSNR) in decibels (dB) of two exemplary encoders—one with and the other without the exemplary flicker-reduction process. FIG. 11 shows the rate-distortion (RD) curves of an exemplary conventional encoder and an encoder applying the exemplary flicker-reduction process 600.

To evaluate the performance of the FCIMS of the present invention, the following flicker measure was applied:

$$S = \underset{p,i(SAD(O(p,i+1),O(p,i))<\varepsilon)}{AVG} SAD(R(p, i+1) - R(p, i), O(p, i+1) - O(p, i)) \quad (5)$$

where
S—the average flicker per MB,
O( )—the original image,
R( )—the reconstructed image,
p—pixel position,
i—the ith frame,
$\varepsilon$—a similarity threshold of the original Macroblock,
O(p,i+1)–O(p,i)—the original difference at pixel p between two frames i and i+1, and
R(p,i+1)–R(p,i)—the reconstructed difference at pixel p between frame i and i+1.

In the experiment/test, the $\alpha$ parameter in equation (1) above, was set to ¼ or 0.25, c to the value 4, and $\varepsilon$ to the value of 1920 for a MB, i.e., the average threshold was 5 per pixel. The Bias was set to the bias of the existing mode and the QP-related bias applied was that indicated in the standard reference software. The standard reference software for H.264, for example, is available from the Internet and may be downloaded from http://iphome.hhi.de/suehring/tml/.

The exemplary test was applied to a quarter common intermediate format (QCIF) sequence, containing a single person communicating by sign language in front of a static background. The static and textured background resulted in severe flickering at lower bit rates. The sequence was encoded with the following parameters: QP=28, 30, 32, 34, 46, and the GOP=15 with an IPPPP structure (baseline profile). The RD curve and flicker measures applying the exemplary reduction process 600 are shown in FIG. 10.

FIG. 11 shows the RD curves of the encoders with or without applying the flicker reduction present. The application of the flicker-reduction process 600 of the present invention reduced the flicker measure. Subjective tests also showed that the flicker was noticeably reduced, thereby improving visual quality.

Embodiments of the present invention may be used in conjunction with other encoding systems, devices, and processes that perform intra-coding, including intra-spatial prediction. Although this invention has been disclosed in the context of certain embodiments and examples, it will be understood by those or ordinary skill in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of ordinary skill in the art based upon this disclosure, e.g., the exemplary flowcharts or processes described herein may be modified and varied and yet still be in the spirit of the invention. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

We claim:

1. A method of encoding, by an encoder, a video comprising a plurality of received pictures, the method comprising:
generating, for each picture of the plurality of received pictures, an intra-coded picture or an inter-coded picture, each of the intra-coded picture comprising a plurality of picture elements and each of the inter-coded picture comprising a plurality of picture elements;
wherein generating the intra-coded picture comprises:
reconstructing each picture element of the plurality of picture elements; and
if a current reconstructed picture element, of the reconstructed picture elements, is located in a flicker area, performing a flicker-control process adapted to select an intra prediction mode based on a flicker-control cost function comprising:
a product of a weighting factor and a distortion of the current reconstructed picture element; and a product of a complement of the weighting factor and a distortion of the previously reconstructed picture element.

2. The method of claim 1, wherein the flicker area is based on whether a counter exceeds a defined threshold.

3. The method of clam 2, wherein the defined threshold is based on a number of pictures in a group of pictures (GOP) associated with the video.

4. The method of claim 1, further comprising:
if the current reconstructed picture element is not in a flicker area, performing an intra-prediction mode selection process adapted to select an intra prediction mode based on a cost function, the cost function based on the current reconstructed picture element and the original picture element.

5. The method of claim 1, further comprising the step of:
tracking whether each picture element of the plurality of picture elements of the inter-coded picture is a flicker area based on whether the picture element has a zero motion vector and whether the picture element is a skipped picture element.

6. The method of claim 5 further comprising the step of:
incrementing a counter associated with said each picture element when the picture element is a determined flicker area.

7. The method of claim 5 further comprising the step of:
resetting the counter associated with said each picture element.

8. The method of claim 1, wherein the method supports H.264 specification.

9. The method of claim 1, wherein the flicker-control cost function is further represented by the following equation:

$$\text{cost} = \alpha \cdot \text{Distortion}_i + (1-\alpha) \cdot \text{Distortion}_{i-1}.$$

10. The method of claim 1, wherein the distortion of the current reconstructed picture element comprises:
a product of a scaling factor and a sum of absolute difference of the current reconstructed picture element and a current original picture element.

11. The method of claim 10, wherein the distortion of the current reconstructed picture element is represented by the following equation:

$$\text{Distortion}_i = c \cdot SAD(R_i, O_i)$$

wherein c is a scaling factor to substantially match the Distortion.$_{i-1}$ with the Distortion$_i$, wherein $R_i$ is the current reconstructed picture element, and wherein $O_i$ is the at least one picture element.

12. The method of claim 1, wherein the distortion of the previously reconstructed picture element comprises:
a product of a scaling factor and a sum of absolute difference of the current reconstructed picture element and the previously reconstructed picture element.

13. The method of claim 12, wherein the distortion of the previously reconstructed picture element is represented by the following equation:

$$Distortion_{i-1} = c \cdot SAD(R_i, R_{i-1})$$

c is a scaling factor to substantially match the $Distortion_{i-1}$ with the $Distortion_i$, and wherein $R_i$ is the current reconstructed picture element, and wherein $R_{i-1}$ is the previously reconstructed picture element.

14. The method of claim 1, wherein the flicker-control cost function further comprises a bias, and wherein the bias is a number related to the intra prediction mode and a quantization parameter.

15. The method of claim 1, wherein the flicker-control cost function is further represented by the following equation:

$$cost = \alpha \cdot Distrotion_i + (1-\alpha) \cdot Distortion_{i-1} + Bias$$

wherein the bias is a number related to the intra prediction mode and a quantization parameter.

16. A device adapted to encode a video comprising a plurality of pictures, each picture comprising a plurality of picture elements, the device comprising:
an intra mode selection module adapted to:
select, based on a flicker-control cost function, an intra prediction mode for a current picture element of the plurality of pictures, the flicker-control cost function comprising:
a product of a weighting factor and a distortion of the current reconstructed picture element; and a product of a complement of the weighting factor and a distortion of the previously reconstructed picture element;
an intra prediction module adapted to:
generate a predicted picture element based on the selected intra prediction mode;
a transformation module adapted to transform a residual picture element based on the generated predicted picture element and the current picture element;
a quantization module adapted to perform quantization on the transformed residual picture element;
an entropy encoder module adapted to perform entropy encoding on the quantized transformed residual picture element to generate an encoded bit stream.

17. The device of claim 16, further comprising:
an inter-prediction module adapted to perform inter prediction;
an inverse quantization module adapted to perform inverse quantization on the residual picture element;
an inverse transformation module adapted to perform inverse transformation on the inverse quantized residual picture element;
a filter adopted to perform de-blocking filter on the inverse transformed inverse quantized residual picture element;
a data store adapted to store the filtered residual picture element.

18. The device of claim 16, further comprising:
a flicker-tracking module adapted to track flicker areas based on whether a picture element is a flicker area based on whether the picture element has a zero motion vector and is a skipped picture element.

19. The device of claim 16,
wherein the intra mode selection module is further adapted to select the intra prediction mode, based on the flicker-control cost function, if the current picture element is a flicker area; and
if the current picture element is not a flicker area, select, based on a cost function, the intra-prediction mode for the current picture element based on the current reconstructed picture element and the original picture element.

20. The device of claim 19, wherein the flicker area is based on whether a counter exceeds a defined threshold.

21. The device of claim 18, wherein the flicker-tracking module is further adapted to increment a counter associated with the current picture element.

22. The device of claim 16, wherein the flicker-control cost function is represented by the following equation:

$$cost = \alpha \cdot Distrotion_i + (1-\alpha) \cdot Distortion_{i-1}.$$

23. The device of claim 16, wherein the distortion of the current reconstructed picture element comprises:
a product of a scaling factor and a sum of absolute difference of the current reconstructed picture element and a current original picture element.

24. The device of claim 23, wherein the distortion of the current reconstructed picture element is represented by the following equation:

$$Distortion_i = c \cdot SAD(R_i, O_i)$$

wherein c is a scaling factor to substantially match the $Distortion,_{i-1}$ with the Distortion, wherein $R_i$ is the current reconstructed picture element, and wherein $O_i$ is the at least one picture element.

25. The device of claim 16, wherein the distortion of the previously reconstructed picture element comprises:
a product of a scaling factor and a sum of absolute difference of the current reconstructed picture element and the previously reconstructed picture element.

26. The device of claim 25, wherein the distortion of the previously reconstructed picture element is represented by the following equation:

$$Distortion_{i-1} = c \cdot SAD(R_i, R_{i-1})$$

wherein c is a scaling factor to substantially match the $Distortion_{i-1}$ with the $Distortion_i$, and wherein $R_i$ is the current reconstructed picture element, and wherein $R_{-1}$ is the previously reconstructed picture element.

27. The device of claim 16, wherein the flicker-control cost function further comprises a bias, and wherein the bias is a number related to the intra prediction mode and a quantization parameter.

28. The device of claim 16, wherein the flicker-control cost function is further represented by the following equation:

$$cost = \alpha \cdot Distrotion_i + (1-\alpha) \cdot Distortion_{i-1} + Bias$$

wherein the bias is a number related to the intra prediction mode and a quantization parameter.

29. A system comprising:
an encoding device, operably coupled to a decoder via a transport medium, the encoding device adapted to encode a video comprising a plurality of pictures, each picture comprising a plurality of picture elements, the device comprising:
a flicker-tracking module adapted to track flicker areas based on whether the picture element has a zero motion vector and is a skipped picture element;

an intra mode selection module adapted to:
if a current picture element of the plurality of picture elements is a flicker area, select, based on a flicker-control cost function, an intra prediction mode for the current picture element, the flicker-control cost function comprises: a product of a weighting factor and a distortion of the current reconstructed picture element; and a product of a complement of the weighting factor and a distortion of the previously reconstructed picture element;
if the current picture element is not in a flicker area, select, based on a cost function, the intra prediction mode for the current picture element, the cost function based on the current reconstructed picture element of the current picture and the current picture element;
an intra prediction module adapted to:
generate a predicted picture element based on the selected intra prediction mode;
a transformation module adapted to transform a residual picture element based on the generated predicted picture element and the current picture element;
a quantization module adapted to perform quantization on the transformed residual picture element;
an entropy encoder module adapted to perform entropy encoding on the quantized transformed residual picture element to generate an encoded bit stream;
a decoding device adapted to decode the encoded bit stream.

30. A method of encoding, by an encoder, a video comprising a plurality of pictures, the method comprising the steps of:
receiving the plurality of pictures; and
for each picture of the plurality of pictures, generating an intra-coded picture or an inter-coded picture, each of the intra-coded picture comprising a plurality of picture elements and each of the inter-coded picture comprising a plurality of picture elements;
wherein the step of generating the intra-coded picture comprises reconstructing each picture element of the plurality of picture elements; and
if a current reconstructed picture element, of the reconstructed picture elements, is located in a flicker area, performing a flicker-control process adapted to select an intra prediction mode based on a flicker-control cost function, the flicker-control cost function based on the reconstructed picture element of a previously reconstructed picture, the current reconstructed picture element, and an original picture element associated with the current reconstructed picture element, and wherein the reconstructed picture element of the previously reconstructed picture, the current reconstructed picture element, and the original picture element are collocated in the same location; and
wherein the flicker-control cost function is represented by the following equation:

$$\text{cost} = \alpha \cdot \text{Distortion}_i + (1-\alpha) \cdot \text{Distortion}_{i-1} + \text{Bias}$$

where $\alpha$ is a weighting factor between 0 and 1,
Bias is selected from at least one of the following:
Bias=$\lambda$*Rate, where $\lambda$ is a Lagrange multiplier and Rate is a coding bit rate; and
Bias= number related to the intra prediction mode and a quantization parameter;

where $\text{Distortion}_{i-1}$ of the previously reconstructed picture element is represented by the following equation:
$\text{Distortion}_{i-1} = c \cdot SAD(R_i, R_{i-1})$
where $R_i$ is the current reconstructed picture element and $R_{i-1}$ is the previously reconstructed picture element;
c is a scaling factor to substantially match the $\text{Distortion}_{i-1}$ with the $\text{Distortion}_i$; and
where $\text{Distortion}_i$ of the current reconstructed picture element is represented by the following equation:

$$\text{Distortion}_i = c \cdot SAD(R_i, O_i)$$

where $O_i$ is the at least one picture element.

31. A device adapted to encode a video comprising a plurality of pictures, each picture comprising a plurality of picture elements, the device comprising:
an intra mode selection module adapted to:
select, based on a flicker-control cost function, an intra prediction mode for a current picture element of the plurality of pictures, the flicker-control cost function based on a reconstructed picture element of a previously reconstructed picture, a current reconstructed picture element of the current picture element, and the current picture element, and wherein the reconstructed picture element of the previously reconstructed picture, the current reconstructed picture element, and the current picture element are collocated in the same location;
an intra prediction module adapted to:
generate a predicted picture element based on the selected intra prediction mode;
a transformation module adapted to transform a residual picture element based on the generated predicted picture element and the current picture element;
a quantization module adapted to perform quantization on the transformed residual picture element;
an entropy encoder module adapted to perform entropy encoding on the quantized transformed residual picture element to generate an encoded bit stream; and
wherein the flicker-control cost function is represented by the following equation:

$$\text{cost} = \alpha \cdot \text{Distortion}_i + (1-\alpha) \cdot \text{Distortion}_{i-1} + \text{Bias}$$

where $\alpha$ is a weighting factor between 0 and 1,
Bias is selected from at least one of the following:
Bias=$\lambda$*Rate, where $\lambda$ is a Lagrange multiplier and Rate is a coding bit rate; and
Bias=number related to the intra prediction mode and a quantization parameter;
where $\text{Distortion}_{i-1}$ of the previously reconstructed picture element is represented by the following equation:
$\text{Distortion}_{i-1} = c \cdot SAD(R_i, R_{i-1})$
where $R_i$ is the current reconstructed picture element and $R_{i-1}$ is the previously reconstructed picture element;
c is a scaling factor to substantially match the $\text{Distortion}_{i-1}$ with the $\text{Distortion}_i$; and
where $\text{Distortion}_i$ of the current reconstructed picture element is represented by the following equation:

$$\text{Distortion}_i = c \cdot SAD(R_i, O_i)$$

where $O_i$ is the current picture element.

* * * * *